(12) United States Patent
Markeli

(10) Patent No.: US 7,318,715 B2
(45) Date of Patent: Jan. 15, 2008

(54) PRESS FOR PRODUCING SHAPED PARTS FROM POWDER MATERIAL

(75) Inventor: Wilfried Markeli, Hermeskeil (DE)

(73) Assignee: KOMAGE-Gellner Maschinenfabrik KG, Kell am See (DE)

( * ) Notice: Subject to any disclaimer, the term of this patent is extended or adjusted under 35 U.S.C. 154(b) by 276 days.

(21) Appl. No.: 10/936,630

(22) Filed: Sep. 7, 2004

(65) Prior Publication Data

US 2005/0058736 A1    Mar. 17, 2005

(30) Foreign Application Priority Data

Sep. 16, 2003   (DE) ................... 103 42 645

(51) Int. Cl.
   *B29C 43/36* (2006.01)
(52) U.S. Cl. ................ 425/78; 425/135; 425/150; 425/412
(58) Field of Classification Search ............ 425/78, 425/135, 149, 150, 352–355, 408, 412
   See application file for complete search history.

(56) References Cited

U.S. PATENT DOCUMENTS 4,260,346 A * 4/1981 Anderson et al. ............ 425/78
4,946,634 A * 8/1990 Shaner ........................ 425/149
5,692,405 A   12/1997 Kirii
6,156,265 A * 12/2000 Sugimoto ..................... 425/78
2004/0195715 A1 10/2004 Grobl et al.

FOREIGN PATENT DOCUMENTS

| DE | 19846210 | 4/2000 |
| EP | 1074380 | 2/2001 |
| GB | 2053074 | 2/1981 |

* cited by examiner

*Primary Examiner*—Yogendra N Gupta
*Assistant Examiner*—Thu Khanh T. Nguyen
(74) *Attorney, Agent, or Firm*—Friedrich Kueffner

(57) ABSTRACT

A press for producing shaped parts of powder material has lifting rods and a transverse part mounted on the lifting rods. A top punch holder is connected to the transverse part. A top punch is mounted in the top punch holder. An eccentric drive acting on the top punch through the lifting rods and the transverse part is provided. The transverse part has an actuating drive acting on the top punch, wherein the actuating drive at least partially compensates an elastic expansion of the press occurring during a pressing stroke.

5 Claims, 3 Drawing Sheets

PRESS FOR PRODUCING SHAPED PARTS FROM POWDER MATERIAL

BACKGROUND OF THE INVENTION

1. Field of the Invention

The invention relates to a press for producing shaped parts from powder material, the press comprising a top punch holder arranged on a transverse part that is supported by lifting rods, in particular, a press further comprising an eccentric crank drive moving the top punch by means of the lifting rods and the transverse part.

2. Description of the Related Art

The stroke/time course of such presses follows in the case of the conventional uniform rotary drive essentially a sine curve that is slightly modified as a result of the slanted positioning of the connecting rods of the eccentric crank drive. However, deviations from this crank drive function are generated by the elastic expansion of the lifting rods and the connecting rods as well as elastic deformations of other parts. Movements within bearing plays etc. can be eliminated by providing pretension.

When planning the applications and the construction of the pressing tools, the operators of the presses use the crank drive function as a base and, if needed, take into account the error in such a way that the top punch position is lowered by the expansion length that has been measured beforehand.

SUMMARY OF THE INVENTION

It is an object of the present invention to enable a compensation of the elastic expansion of the press that is as precise as possible.

In accordance with the present invention, this is achieved in that in a press of the aforementioned kind the transverse part comprises an actuating drive for the top punch that compensates at least partially the elastic expansion of the press during the pressing stroke.

The actuating drive for the compensation movement of the top punch requires in general only a working range of up to 3 mm and can be controlled to occur temporally closely to the stroke movement of the press. It is possible to adjust essentially a precise, unaltered crank drive function. However, it is also possible to provide an optionally desired modification of the crank drive function by overcompensation or undercompensation of the expansion, even partially, for example, widening of the curve at the apse or a temporal displacement of the apse.

Preferably, the actuating drive is controlled based on the actual expansion of the press, respectively.

In contrast to the aforementioned prior art methods, the compensation is then matched precisely to the actual expansion that can vary as a result of fluctuations of the filling level of the tool. The dimensional accuracy of the shaped part is improved in this way.

Moreover, the compensation action is already present at any point in time during the pressing stroke; in contrast to this, in the case of a fixed lower position of the top punch according to the prior art, assuming the right filling level is present, compensation is achieved only at the end while prior to this overcompensation is present over the entire stroke travel. In the case of divided bottom punch planes, this overcompensation is disruptive in regard to the calculated interaction of the top punch or top punches with the bottom punches and the desired relative movements of the punches within the die. There is the risk of hairline crack formation in the shaped part. By means of the provided compensation, on the other hand, the movements of the shaped part that is being produced can be calculated in an error-free way.

In this regard, a substantial improvement could already be achieved with a fixed control program for the actuating drive which program compensates the expansion, even though not individually precisely, progressively during the pressing stroke.

According to an especially advantageous embodiment of the invention, the actuating drive is controlled based on a load cell arranged on the axis of the top punch holder in connection with a force/expansion function that is stored within a control unit of at least one of the lifting rods, preferably of the press as a whole, so that the control circuit is provided.

This indirect measuring of the expansion is particularly simple, precise and free of problems and does not require any additional expenditure because, normally, a load cell is usually mounted within the top punch anyway.

When manufacturing the press, the elastic expansion of the completed press must be measured only once at a preferably high pressing force, and the resulting force/expansion function must be stored within the control unit.

Another possibility resides in that the expansion is determined by means of an incremental or absolute ruler or the like. It would be possible for the ruler to directly follow the stroke at the transverse part or the transverse member and transmit the stroke to the control unit; the position of the eccentric shaft is also input continuously into the control unit by means of an angle transducer so that the theoretical stroke is available and the measured value can be compared with the theoretical value.

According to another advantageous embodiment of the invention, the actuating drive is a hydraulic drive. In this connection, the realization of the invention often does not require any extra expenditure. The piston cylinder can serve at the same time for providing the initial adjustment of the top punch relative to the pressing tool, and a piston cylinder is provided anyway for this purpose in many press configurations.

In order to realize the invention, the piston cylinder is then provided only with a different valve for loading with the pressure liquid, expediently in the form of a servo valve.

It is also conceivable that the adjustment provided according to the invention is carried out by means of a motor, for example, a step motor, a servo motor, a hydraulic motor or similar devices.

DESCRIPTION OF THE PREFERRED EMBODIMENTS

Figure 1:
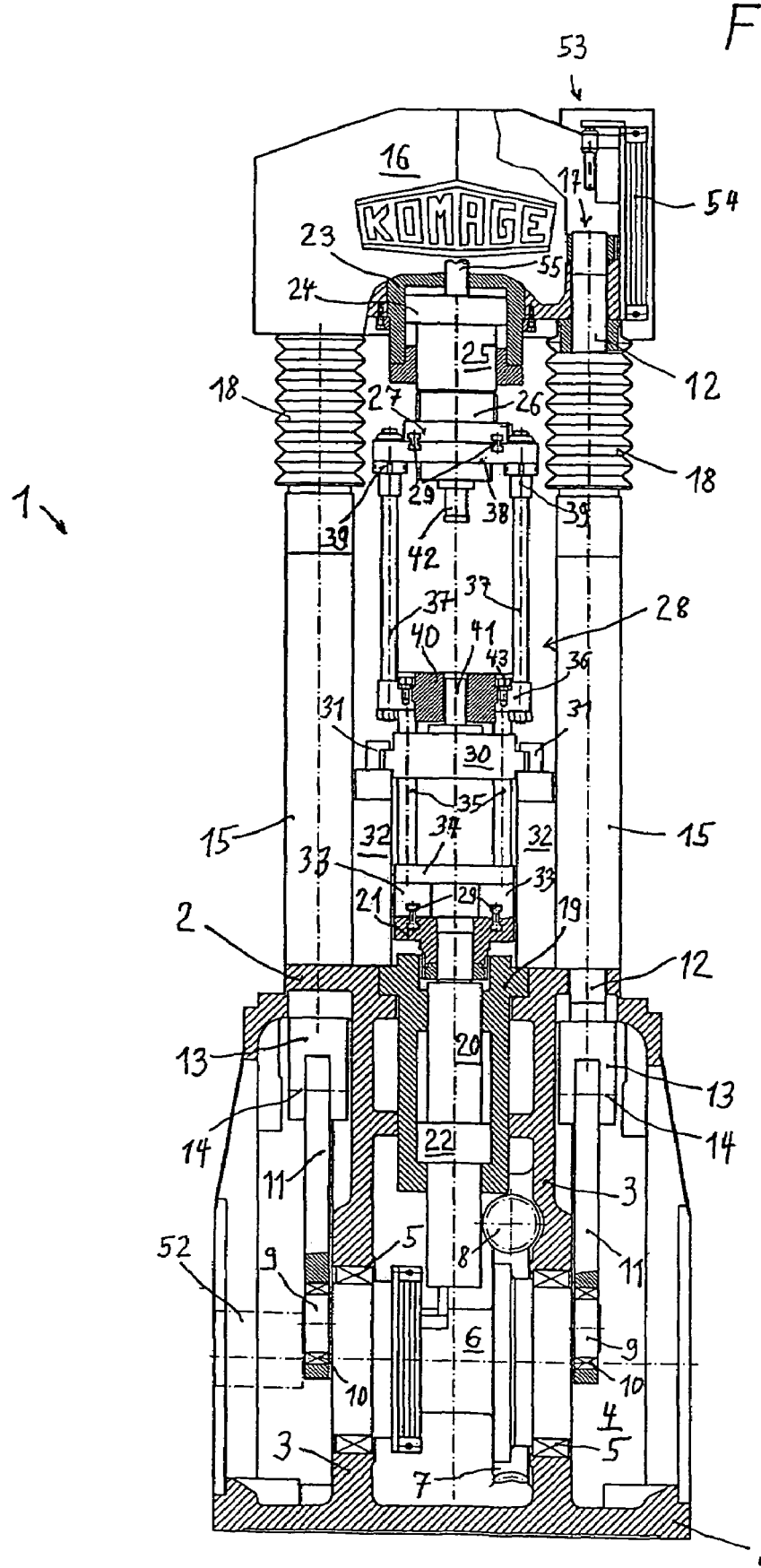
FIG. 1 shows a press for producing shaped parts from powder material, partially in a side view, partially in a vertical section view.

As a base part, the press 1 has a cast housing 2 that is substantially open on three sides. The section according to FIG. 1 extends through two intermediate walls 3 of the cast housing 2. The back wall 4 is shown in elevation.

An eccentric shaft 6 is rotatably supported in bearings 5 arranged in the intermediate walls 3. The shaft 6 is provided with a worm gear 7. The worm drive gear 8 engages the worm gear 7 and projects through the backwall 4 out of the cast housing 2. It is provided at the backside of the cast housing 2 with a flywheel and is driven by an electric motor.

Two eccentric axle pins 9 at the ends of the eccentric shaft 6 are connected by connecting rods 11, arranged in bearings 10 on the axle pins 9, to four lifting rods 12. The connecting rods 11 are pivotably connected at 14 to short transverse beams 13 having a U-shaped cross-section. Two lifting rods 12 extend upwardly from the transverse beams 13, respectively.

The lifting rods 12 are guided within webs 15 that are fixedly connected to the cast housing 2 and are provided with two bores, respectively. At their upper ends, they are connected to a transverse part 16. The connection to the transverse part 16 is illustrated at 17. The transverse part 16 is also embodied as a cast housing.

The upper ends of the lifting rods 12 projecting from the webs 15 are enclosed by bellows 18.

For moving a tool part, a cylinder unit 19 with piston 22 is mounted in the cast housing 2. A transverse member 21 is mounted in a compression-proof and tensile load-proof fashion on the piston rod 20 for securing an adapter thereto. The length of the transverse beam 21 is greater in the direction perpendicular to the drawing plane then in the illustrated section view. A cylinder unit 23 with a piston 24 is arranged in the transverse part 16 for moving in opposite direction to the cylinder unit 19; the cylinder unit 19 is provided for realizing the initial adjustment of the top punch and expansion compensation of the press. The piston rod 25 of the piston 24 supports with intermediate arrangement of a load cell 26 also a transverse beam 27 for connecting the adapter thereto.

By means of the adapter 28 the pressing tool is inserted into the press.

The adapter 28 is fastened to the transverse beams 21 and 27 by means of rails 29 that have an H-shaped cross-section and engage matching grooves in the transverse beams 21, 27. Otherwise, the adapter is mounted on a stationary bottom punch plate 30 on the stationary press frame. The bottom punch plate 30 is connected by means of clamps 31 to two supports 32 mounted on the two webs 15 of the cast housing 2. The supports 32 are solid.

A bridge 34 is directly connected to the lower transverse member 21 by means of two beams 33. On the bridge 34, four rods 35 extending longitudinally slidably through matching bores provided in the bottom punch plate 30 are mounted and support a die holder 36. Four guide rods 37 project upwardly from the die holder 36 and extend longitudinally slidably in corresponding slide bearings 39 through a top punch plate 38.

The already mentioned connection of the adapter to the upper transverse member 27 is realized at the top punch plate 38.

The pressing tool is comprised in the present case of a die 40, a bottom punch 41 projecting from below into the die 40, and a top punch 42 penetrating from above into the die 40.

The matrix 40 has a seat within the die holder 36 and is fastened thereto by an annular arrangement of screws 43.

The bottom punch 41 is arranged on the bottom punch plate 30 and is thus stationary.

The top punch 42 is arranged on the top punch plate 38.

The shaped part is pressed within the die 40 from a powder material filled into the die between the stationary bottom punch 41 and the top punch 42 that is moved by means of the eccentric drive 6 to 11 via the transverse beam 13, the lifting rods 12, the transverse part 16, and the devices 23 to 27. The top punch plate 38 moves downwardly on the guide rods 37. During pressing, by slightly lowering of the die 40 by means of the cylinder unit 19, the bottom punch 41 can also be moved relative to the die 41.

By completely lowering the die 40 relative to the bottom punch 41, the finished shaped part is ejected.

Figure 3:
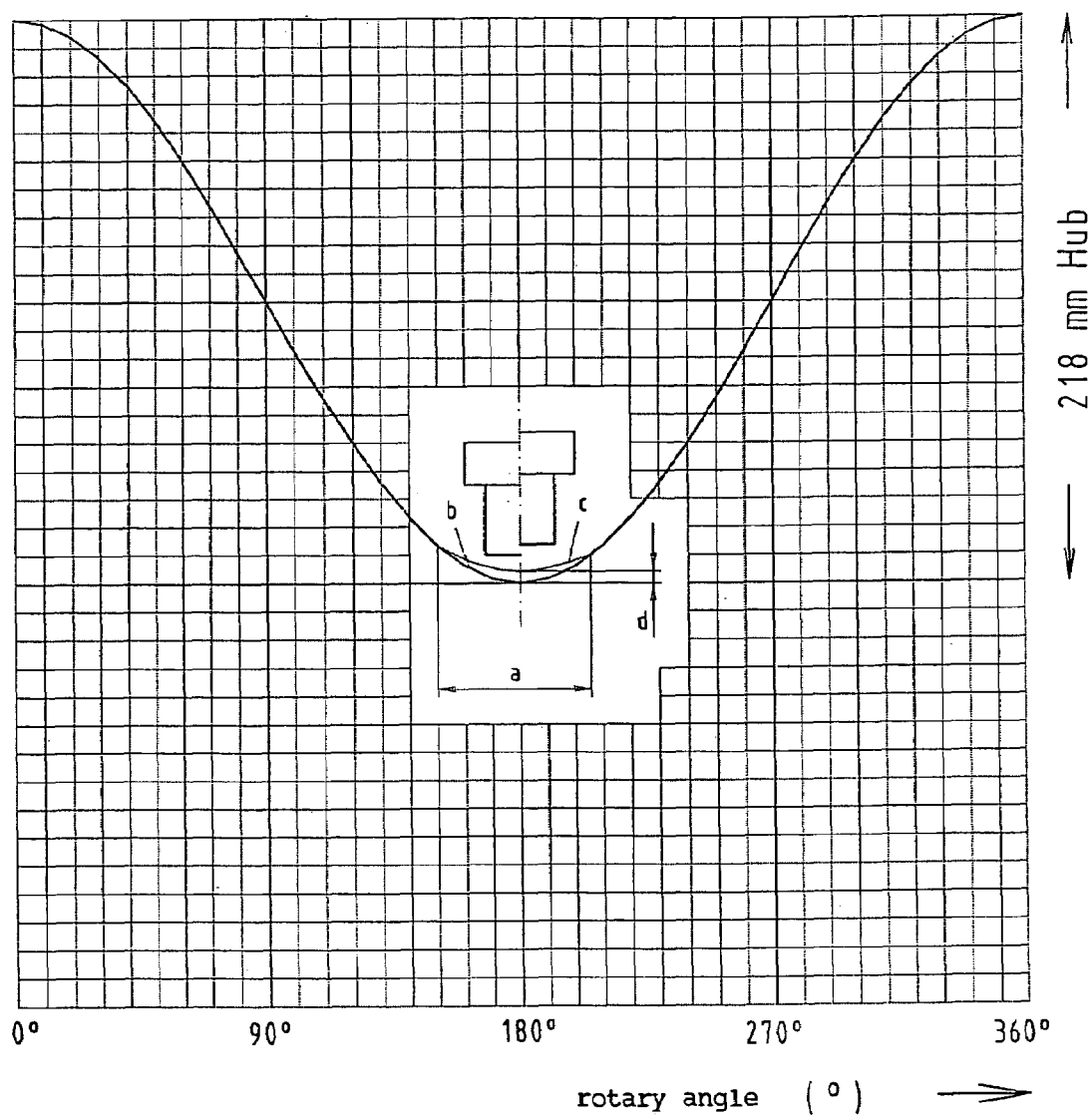
FIG. 3 shows a travel (stroke)/time (rotary angle) diagram.

The travel/time course of the top punch during the stroke is illustrated in FIG. 3 as a stroke/rotary angle diagram. (The rotation is uniform in the present example.)

On the two branches of the curve up to approximately 150° and beginning at approximately 205°, the theoretical stroke travel and the actual stroke travel coincide. In the area a in between, the theoretical and the actual courses of the curve differ. The curve section b represents the theoretical course, the curve section c represents the actual course if no counter measures are initiated. The difference d at the apse is 1 mm in the illustrated example.

In FIG. 3, the difference in the position of the top piston is illustrated above the curve.

The difference is mainly the result of the elastic expansion of the lifting rods 12. To a minimal extent, the difference is also caused by expansion and bending of the transverse beam 13, expansion of the connecting rods 11, and, on the other hand, compression of the bearings 5 and 10, as well as, very minimally, also the compression of the intermediate walls 3 and the supports 32 as well as bending of the bottom punch plate 30 and compression of the bottom punch. Finally, compression of the top punch and of the other parts positioned on its axis contributes also to the difference.

Figure 2:
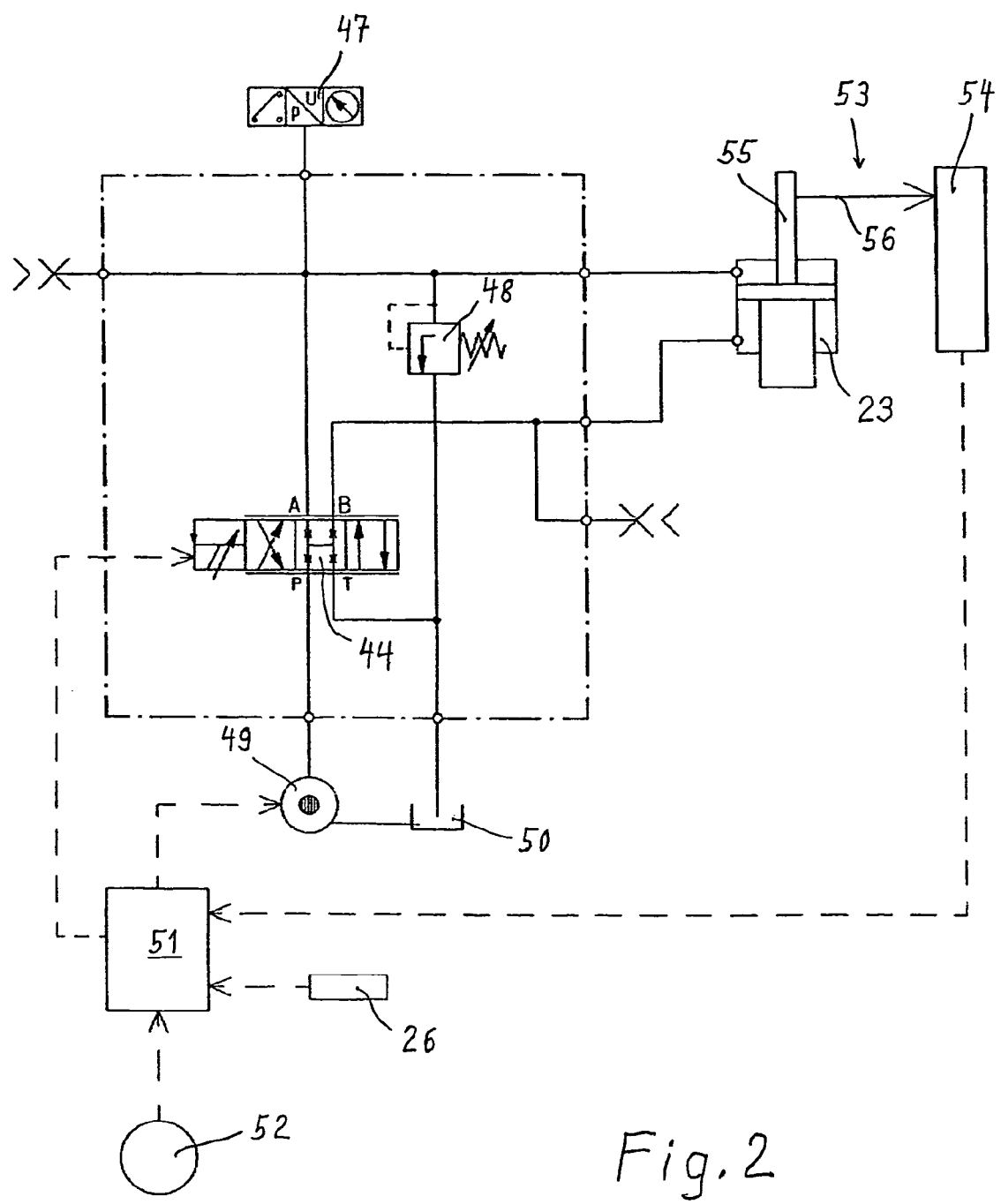
FIG. 2 shows schematically the control of a part of the press.

The difference d is compensated according to the invention by the hydraulic control of the cylinder unit 23 illustrated in FIG. 2 and electric control of the valves of the hydraulic control.

In regard to the hydraulic control, only the control elements will be mentioned specifically in the following: main control valve 44, electric overpressure switch 47, additional mechanical overpressure valve 48, and also pump 49 and tank 50. The letters P and T indicate, as is conventional, pump connector and tank connector (=return connector), A and B indicate consumer connectors, i.e., connectors of the two cylinder chambers. In other respects, the configuration is illustrated by conventional symbols. The function is apparent from these elements.

The electrical control is comprised of a central control unit 51, the load cell 26, an angle transducer 52 that is arranged in the cast housing 2 adjacent to the eccentric shaft 6 and is adapted to measure the shaft position, as well as a travel measuring device 53 for the piston 24. The travel measuring device 53 is comprised of an incremental or absolute ruler 54 that is acted upon by a position indicator 56 mounted on a second piston rod 55 of the piston 24. In place of the ruler 54, it is also possible to employ an angle transducer that is actuated by the piston rod 55 by means of a toothed rack.

Additional control connections, for example, the control of the cylinder unit 19 as a function of the angular position of the eccentric shaft, are not illustrated.

The expansion compensation is realized as follows.

When first starting the press, the expansion of the press between the transverse member 27 and the topside of the cast housing 2 or of the supports 32 has been measured once with maximum force being applied. The resulting force/expansion function has been saved within the control unit 51.

In operation of the press, the pressing force that is determined by the load cell 26 is transmitted to the control unit 51 and compared in the control unit to the saved force/expansion function. Based on the resulting expansion, the piston 24 is moved forwardly by the amount of expansion essentially simultaneously by actuation of the main control valve 44. The feed is measured by the travel measuring device 53 and processed in the control unit 51 for actuating the main control valve 44.

The reverse actuation of the main control valve 44 returns the piston 24 for the return stroke.

The course c of the curve as illustrated in FIG. 3 is changed in close approximation to the theoretical course b of the curve.

The deformations within the tool are not taken into account. However, this could be done also by appropriate expansion measurements.

As an example for illustrating the invention, a 100 metric ton press with a piston having a diameter 250×30 mm and with a maximum expansion of 1 mm is considered. For example, a servo valve, optionally even a proportional valve, with a flow rate of 40 1/min is used as the main control valve 44. The cycle time of the electrical control is, for example, 0.5 ms, the response time of the servo valve 12.0 ms.

For 1 mm expansion compensation 0.0725 seconds are thus required. When employing a total pressing range of 55°, i.e. 27.5°, the expansion is generated within a time of 0.229 seconds.

The immediately occurring compensation is therefore performed that much faster than the generation of the expansion so that only a very minimal delay will result.

The pump pressure in the present example is 220 bar.

While specific embodiments of the invention have been shown and described in detail to illustrate the inventive principles, it will be understood that the invention may be embodied otherwise without departing from such principles.

What is claimed is:

1. A press for producing shaped parts of powder material, the press comprising:
   rods;
   a transverse part mounted on the rods;
   a top punch holder connected to the transverse part;
   a top punch mounted in the top punch holder;
   an eccentric drive acting on the top punch through the rods and the transverse part;
   wherein the transverse part comprises an actuating drive acting on the top punch, wherein the actuating drive is configured to at least partially compensate for only an elastic expansion of the press occurring during a pressing stroke; and
   a control unit configured to control the actuating drive, wherein the top punch holder comprises a load cell arranged on an axis of the top punch holder and wherein a force/expansion function is stored in the control unit, wherein the control unit controls the actuating drive based on values measured by the load cell and based on the stored force/expansion function so that the compensation of the press is maintained at all times during the pressing stroke nearly simultaneous with the expansion.

2. The press according to claim 1, wherein the force/expansion function encompasses the expansion of the entire press.

3. The press according to claim 1, wherein the actuating device is a hydraulic drive.

4. The press according to claim 3, comprising a servo valve for controlling flow of a hydraulic medium to the hydraulic drive.

5. The press according to claim 1, wherein the actuating drive is configured to control an initial adjustment of the top punch relative to a pressing tool of the press.

* * * * *